(12) United States Patent
Kim et al.

(10) Patent No.: US 10,446,330 B2
(45) Date of Patent: Oct. 15, 2019

(54) ELASTIC FIBER ELECTRODE, MICRO-SUPERCAPACITOR USING SAME, AND PREPARATION METHOD THEREFOR

(71) Applicant: INDUSTRY-UNIVERSITY COOPERATION FOUNDATION HANYANG UNIVERSITY, Seoul (KR)

(72) Inventors: Seonjeong Kim, Seoul (KR); Changsoon Choi, Seoul (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 29 days.

(21) Appl. No.: 15/516,283

(22) PCT Filed: Oct. 1, 2015

(86) PCT No.: PCT/KR2015/010373
§ 371 (c)(1),
(2) Date: Mar. 31, 2017

(87) PCT Pub. No.: WO2016/053020
PCT Pub. Date: Apr. 7, 2016

(65) Prior Publication Data
US 2017/0309409 A1    Oct. 26, 2017

(30) Foreign Application Priority Data

Oct. 1, 2014  (KR) .................. 10-2014-0132695

(51) Int. Cl.
*H01G 11/36* (2013.01)
*H01G 11/26* (2013.01)
(Continued)

(52) U.S. Cl.
CPC .............. *H01G 11/26* (2013.01); *H01B 1/04* (2013.01); *H01B 5/14* (2013.01); *H01G 11/24* (2013.01);
(Continued)

(58) Field of Classification Search
CPC ........ H01G 11/36; H01G 11/04; H01G 11/28; H01G 11/26; H01G 11/50; H01G 11/68; H01G 11/86; H01G 11/40
See application file for complete search history.

(56) References Cited

U.S. PATENT DOCUMENTS

2007/0215841 A1* 9/2007 Ford .................. B82Y 30/00
                                                      252/503
2007/0243124 A1* 10/2007 Baughman ............ B82Y 30/00
                                                      423/447.1
(Continued)

FOREIGN PATENT DOCUMENTS

| KR | 10-0851431 B1 | 8/2008 |
| KR | 10-2012-0032286 A | 4/2012 |
| KR | 10-1214787 B1 | 12/2012 |
| KR | 10-2013-0100239 A | 9/2013 |

OTHER PUBLICATIONS

Carter S. Haines et al., "Artificial Muscles from Fishing Line and Swing Thread", Science, Feb. 21, 2014, pp. 868-872, vol. 343, Issue 6173.
International Search Report for PCT/KR2015/010373, dated Jan. 22, 2016.

*Primary Examiner* — Nguyen T Ha
(74) *Attorney, Agent, or Firm* — Sughrue Mion, PLLC (57) ABSTRACT

The present invention relates to an elastic fiber electrode including a hybrid fiber prepared by coating a carbon nanotube sheet on a polymer fiber, in which the hybrid fiber is in a yarn form having a coiled structure, and the carbon nanotube sheet makes a wrinkled surface, and a coil- or spring-type elastic fiber electrode manufactured by coiling a
(Continued)

hybrid nanofiber prepared by coating a carbon nanotube sheet on a polymer fiber has excellent mechanical and electrical properties. In particular, the elastic fiber electrode has increased porosity by depositing manganese dioxide on a surface thereof, thereby enhancing electrochemical performance. Thus, a micro-supercapacitor using the elastic fiber electrode has high current density and excellent capacitance retention, may maintain the electrochemical characteristics even after being subjected to various deformations, such as bending, coiling, or weaving, and has high elasticity and reversible behaviors, thus providing stable capacitance.

20 Claims, 9 Drawing Sheets

(51) Int. Cl.
| | | |
|---|---|---|
| *H01G 11/40* | (2013.01) | |
| *H01G 11/86* | (2013.01) | |
| *H01B 5/14* | (2006.01) | |
| *H01G 11/24* | (2013.01) | |
| *H01G 11/30* | (2013.01) | |
| *H01G 11/46* | (2013.01) | |
| *H01B 1/04* | (2006.01) | |

(52) U.S. Cl.
CPC .............. *H01G 11/30* (2013.01); *H01G 11/36* (2013.01); *H01G 11/40* (2013.01); *H01G 11/46* (2013.01); *H01G 11/86* (2013.01); *Y02E 60/13* (2013.01)

(56) References Cited

U.S. PATENT DOCUMENTS

| | | | | |
|---|---|---|---|---|
| 2011/0097624 | A1* | 4/2011 | Bhatt | H01G 9/042 429/163 |
| 2011/0304964 | A1* | 12/2011 | Fleischer | B82Y 30/00 361/679.01 |
| 2013/0104515 | A1* | 5/2013 | Heitmann | B29C 70/50 57/210 |
| 2014/0373502 | A1* | 12/2014 | Cour | D02G 3/328 57/225 |
| 2014/0376158 | A1* | 12/2014 | Kim | H01G 11/24 361/502 |
| 2015/0292124 | A1* | 10/2015 | Lee | D02G 3/48 57/255 |

* cited by examiner

ELASTIC FIBER ELECTRODE, MICRO-SUPERCAPACITOR USING SAME, AND PREPARATION METHOD THEREFOR

CROSS REFERENCE TO RELATED APPLICATIONS

This is a National Stage of International Application No. PCT/KR2015/010373 filed Oct. 1, 2015, claiming priority from Korean Patent Application No. 10-2014-0132695 filed Oct. 1, 2014, the contents of all of which are incorporated herein by reference in their entirety.

TECHNICAL FIELD

The present invention relates to an elastic fiber electrode and a micro-supercapacitor using the same, and more particularly, to an elastic fiber electrode manufactured by coating a conductive carbon nanotube sheet on a polymer fiber and coiling the resulting structure, on which manganese dioxide is deposited, a micro-supercapacitor using the same and thus having excellent electrochemical characteristics, and a method of manufacturing the micro-supercapacitor.

BACKGROUND ART

To meet consumer demand for a variety of multifunctional electronic devices, such as microelectronic devices, medical devices, wearable electrical materials, and the like, the development of power sources such as smaller, thinner, lighter, and environmentally friendly supercapacitors or batteries has received much attention.

Among such power sources, supercapacitors use a charge phenomenon by movement of ions to the interface between an electrode and an electrolyte or a surface chemical reaction unlike batteries using a chemical reaction, and thus have higher charge/discharge efficiency and longer lifespans than those of batteries. Therefore, such supercapacitors have drawn great attention as a next-generation energy storage apparatus. Of these supercapacitors, micro-supercapacitors (micro-electromechanical systems) use nano- or micro-structured materials instead of large-scale materials, and thus have a large surface area per volume, resulting in easy access of an electrolyte. Thus, various studies into use thereof as a portable and lightweight power source which may be applied to small electronic devices, such as small robots, wearable electronic fabrics, implantable medical devices, and the like, have been conducted.

Recently, a variety of micro-supercapacitors having increased energy and power density have been developed through effective structural design or various preparation methods of various active materials, such as carbon nanotubes, reduced graphene oxides, activated carbon, conductive polymers, and metal oxides. For example, a twist-spun yarn super-capacitor using carbon nanotubes, which are one-dimensional carbon nanostructures, has an excellent pore structure and strength, but a scale-up process for industrialization is complicated, applicable fields are limited, its elasticity is low enough to cause breakage even at an elongation of 10%, and high manufacturing costs are required.

To address these problems, wet spun graphene or carbon nanotube (CNT) composite fibers are disclosed. These materials have improved elasticity compared to the above-described fibers, but a process of preparing mixing materials such as single-wall carbon nanotubes is complicated, use of highly purified materials is required, and the preparation process is performed under high-temperature and high-pressure conditions, requiring high manufacturing costs. In addition, a scale-up process thereof for industrialization is also complicated and difficult.

In addition, metal wires having electrical conductivity may be added to an electrode, but may act as an obstacle to application thereof to small electronic devices, such as wearable electronic fabrics and the like, due to their intrinsic stiffness and rigidity.

To address the above-described problems, a yarn-type micro-supercapacitor, manufactured by coiling a hybrid membrane obtained by coating a conductive polymer on a high-density carbon nanotube sheet, is disclosed (Korean Patent Application Registration No. 10-1214787). However, such a yarn-type micro-supercapacitor also has low elasticity and is expensive, and manufacturing processes are sensitive and complicated, and thus applicable fields are limited.

Therefore, there is a need to develop a micro-supercapacitor that has mechanical characteristics sufficient to endure various forms and deformations, excellent electrochemical characteristics, a long lifespan, and may be easily and conveniently manufactured.

DISCLOSURE

Technical Problem

The present invention has been made in view of the above problems, and it is one object of the present invention to provide an elastic fiber electrode that has high elasticity and a large electrochemical surface area, and may be used in various applications.

It is another object of the present invention to provide a micro-supercapacitor using the above-described elastic fiber electrode and having excellent electrochemical characteristics and high electrical capacity.

It is still another object of the present invention to provide a manufacturing method whereby the micro-supercapacitor using the above-described elastic fiber electrode may be mass-produced.

Technical Solution

The prevent invention provides an elastic fiber electrode including a hybrid fiber prepared by coating a carbon nanotube sheet on a polymer fiber, wherein the hybrid fiber is in a yarn form having a coiled structure, and the carbon nanotube sheet makes a wrinkled surface.

The coiled structure is formed by continuous coiling and has a coil or spring shape.

The polymer fiber is a nylon fiber or a polyester fiber.

The carbon nanotube sheet disposed on a surface of the elastic fiber electrode is aligned in one direction and has a porous structure.

The elastic fiber electrode is bendable, knottable, and weavable.

The elastic fiber electrode is contracted with 100% to 600% less length than the polymer fiber in an initial state.

The present invention also provides an elastic fiber electrode including: a hybrid fiber prepared by coating a carbon nanotube sheet on a polymer fiber, the hybrid fiber being in a yarn form having a coiled structure and the carbon nanotube sheet making a wrinkled surface; and a manganese dioxide layer deposited on a surface of the hybrid fiber.

The elastic fiber electrode has an elongation of 100% to 600%.

The elastic fiber electrode maintains a capacitance of 80% to 99% even when stretched by 10% to 200%, and has a reversible structure such that the elastic fiber electrode has an original capacitance when having returned to an initial state.

The present invention also provides a micro-supercapacitor including at least one of the above-described elastic fiber electrodes.

The micro-supercapacitor is operable as a capacitor in a liquid or solid electrolyte.

The micro-supercapacitor has a capacitance per unit length of 3 mF/cm to 10 mF/cm and a capacitance per unit area of 30 mF/cm$^2$ to 60 mF/cm$^2$.

The micro-supercapacitor has a current density of 0.2 mA/cm$^2$ to 10 mA/cm$^2$.

The micro-supercapacitor is bendable, knottable, weavable, and standable.

The present invention also provides a method of manufacturing a micro-supercapacitor, including: (a) preparing a hybrid nanofiber by coating a carbon nanotube sheet on a polymer fiber in a wrapping manner; (b) manufacturing an elastic fiber electrode by attaching an end of the hybrid nanofiber to a motor shaft and coiling the hybrid nanofiber by rotating the motor shaft; and (c) depositing manganese dioxide on a surface of the elastic fiber electrode.

In the (b) process, the hybrid nanofiber may be coiled in a wet state, and the depositing of the (c) process is performed by electrochemical deposition.

The polymer fiber is a nylon fiber or a polyester fiber.

The carbon nanotube sheet is a high-density sheet formed by evaporating alcohol from a carbon nanotube aerogel sheet.

Advantageous Effects

According to the present invention, a coil- or spring-type elastic fiber electrode manufactured by coiling a hybrid nanofiber prepared by coating a carbon nanotube sheet on a polymer fiber has high elasticity and conductivity. In particular, the elastic fiber electrode may have increased porosity by depositing manganese dioxide on a surface thereof, thereby enhancing electrochemical performance. Thus, a micro-supercapacitor using the elastic fiber electrode has high current density and excellent capacitance retention, may maintain the electrochemical characteristics even after being subjected to various deformations, such as bending, coiling, or weaving, and may provide a stable capacitance even after 100 cycles of stretching/releasing. Due to these characteristics, the elastic fiber electrode and a micro-supercapacitor using the same may be widely used in various fields, such as rotary actuators, medical instruments, and wearable electronic products.

DESCRIPTION OF DRAWINGS

The above and other objects, features and other advantages of the present invention will be more clearly understood from the following detailed description taken in conjunction with the accompanying drawings, in which.

BEST MODE

Hereinafter, various aspects and embodiments of the present invention will be described in more detail.

Conventional fiber electrodes have low tensile stress, are inelastic, become easily defective or broken, and have low elasticity, and thus are not suitable for use in various applications. For example, in a case in which a twist-spun carbon nanotube fiber electrode is continuously coiled, when a pressure gradually increases, the fiber electrode is irreversibly deformed, in particular, is broken at an elongation of 7% to 8%. In addition, a wet spun carbon nanotube/graphene fiber electrode is broken such as having defects even at an elongation of only 10%.

Due to the problems of performance such as elasticity, conventional fiber electrodes cannot be used as rotary muscles acting in a tensile direction, deformable electrodes, and the like, and thus applicable fields are limited.

Research and development has been conducted to address the above-described problems and manufacture a one-dimensional elastic fiber electrode having high elasticity and thus applicable in various fields, thus completing the development of an elastic fiber electrode of the present invention.

An elastic fiber electrode according to an embodiment of the present invention includes a hybrid fiber having a polymer fiber and a carbon nanotube sheet on the polymer fiber, in which the hybrid fiber is in a yarn from having a coiled structure, and hybrid fiber having the coiled structure has a wrinkled surface formed by the carbon nanotube sheet. A structure of the elastic fiber electrode is illustrated in FIG. 1.

Figure 1:
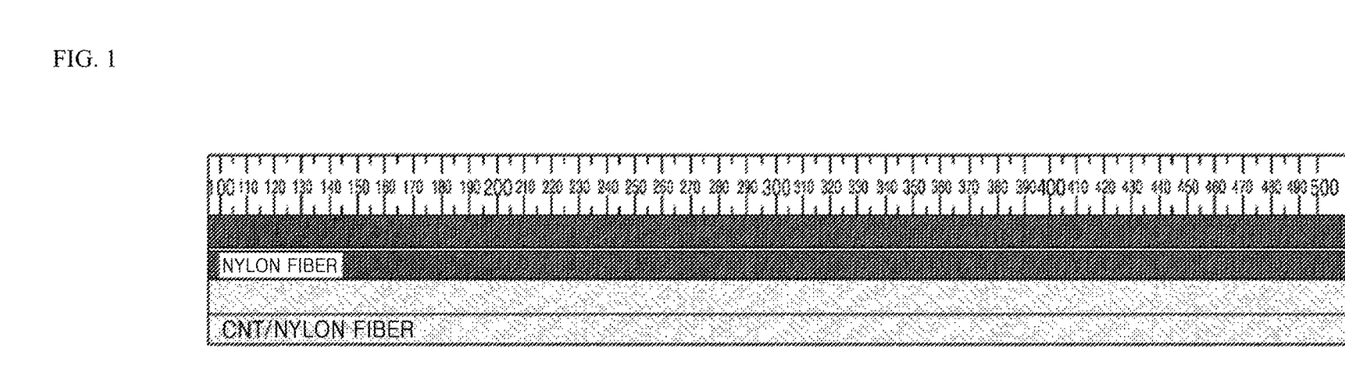
FIG. 1 is an actual image showing an fiber electrode according to the present invention, a nylon fiber before being coated with a carbon nanotube sheet, and a ruler.
Figure 2:
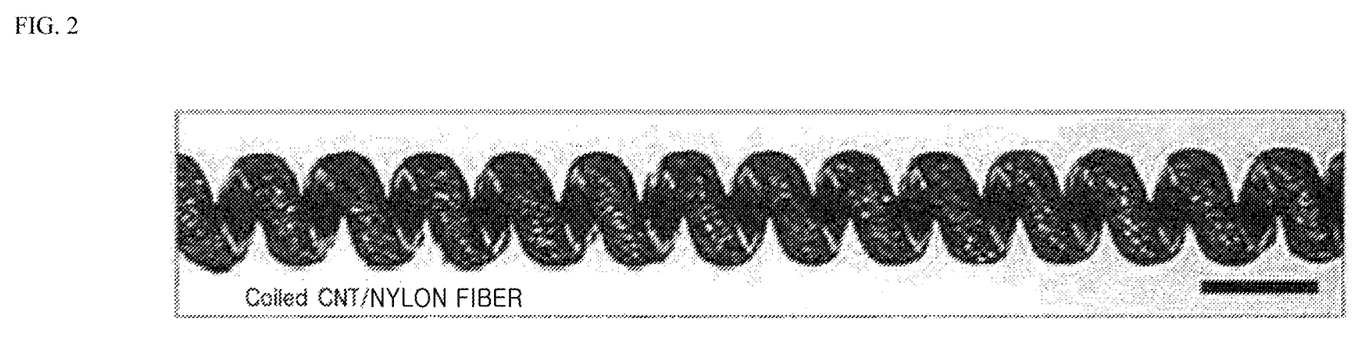
FIG. 2 is a scanning electron microscope (SEM) image of an elastic fiber electrode according to the present invention, in which the elastic fiber electrode is manufactured by coating a carbon nanotube sheet on a nylon fiber (diameter: 102 μm) and coiling the resulting structure, and is in a coil or spring form, and the scale bar represents 300 μm.

As illustrated in FIG. 1, as the hybrid fiber is continuously coiled by the number of turns (turns/meter), the hybrid fiber has a coil and spring shape and, consequently, a totally coiled elastic fiber electrode may be obtained. The shape of the elastic fiber electrode according to the present invention is illustrated in FIG. 2.

The elastic fiber electrode is coiled in a wet state using an electric motor. In this regard, the number of turns may be about 1,000 turns/m to about 10,000 turns/m.

In addition, a surface of the elastic fiber electrode is coated with a uniaxially aligned carbon nanotube sheet having a wide surface area, and the carbon nanotube sheet has micro-sized wrinkles, thereby exhibiting a high surface area and porosity.

The elastic fiber electrode may have a porosity of 20% to 80%.

The elastic fiber electrode is in a contracted state with 100% to 600% less length than the hybrid fiber in the initial state, which means that the applied pressure is stored in the elastic fiber electrode during coiling. This may be confirmed in FIG. 5.

That is, a high pressure is applied to the inside of the hybrid fiber during coiling, and the elastic fiber electrode is squeezed to absorb an excessively applied pressure in this process and, as a result, the length of nylon fiber positioned at the center of the elastic fiber electrode decreases, and the carbon nanotube sheet positioned on a surface thereof has wrinkles. The wrinkled surface of the carbon nanotube sheet causes an increase in surface area capable of adsorbing ions and, accordingly, the amount of charges stored is increased.

In addition, in the elastic fiber electrode, the polymer fiber may have an average thickness of 50 μm to 150 μm.

The elastic fiber electrode is contracted with 100% to 600% less length than the polymer fiber in the initial state and, thereafter, has high elasticity sufficient for stretching by 100% to 600%. In addition, even though the elastic fiber electrode is stretched by 100% to 200%, capacitance thereof is maintained at 80% or more, which indicates that the elastic fiber electrode has excellent electrochemical characteristics. In addition, the elastic fiber electrode exhibits a reversible behavior such that the capacitance thereof completely returns to the initial state when contracted.

More particularly, the elastic fiber electrode may be manufactured by drawing a carbon nanotube sheet from a carbon nanotube forest and coating a surface of a polymer fiber with the carbon nanotube sheet in a wrapping manner to prepare a hybrid fiber, and coiling the hybrid fiber at a strong pressure.

Figure 3:
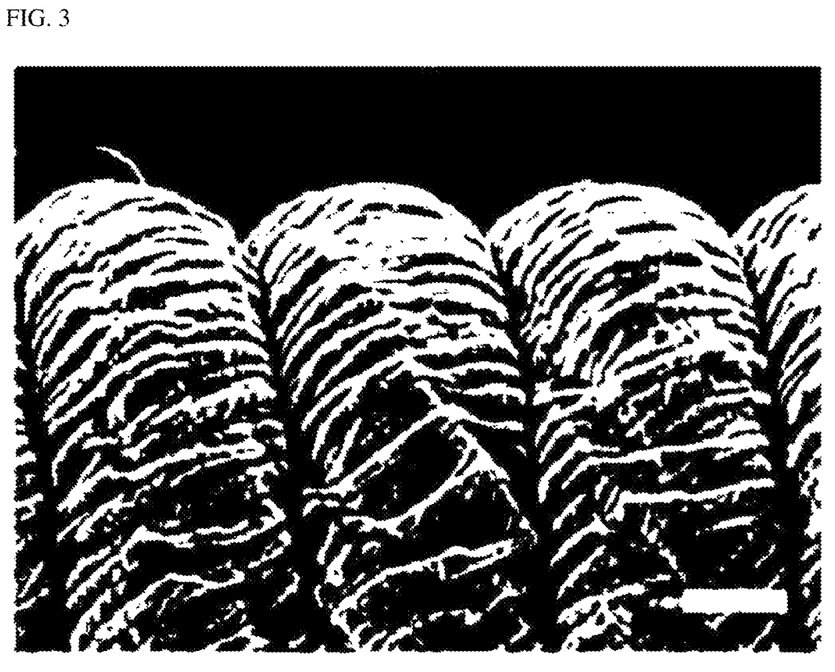
FIG. 3 is an enlarged SEM image showing a surface of the elastic fiber electrode of FIG. 2, in which the scale bar represents 50 μm.

FIG. 3 is a high-magnification enlarged scanning electron microscope (SEM) image showing a surface of the elastic fiber electrode of FIG. 2, in which it is confirmed that the morphology of the surface of the elastic fiber electrode is aligned in one direction and has high porosity, and the surface characteristics contribute to enhancement of electrochemical surface area and electrical conductivity of the elastic fiber electrode of the present invention.

Since the carbon nanotube sheet has a wrinkled surface, the carbon nanotube sheet is wrinkled or unwrinkled in a stretching or releasing process, and thus the micro-structure is not broken and high capacitance retention is maintained.

According to another embodiment of the present invention, an elastic fiber electrode includes: a hybrid fiber having a polymer fiber and a carbon nanotube sheet coated on the polymer fiber, in which the hybrid fiber is in a yarn form having a coiled structure, hybrid fiber having the coiled structure has a wrinkled surface formed by the carbon nanotube sheet; and a manganese dioxide layer deposited on a surface of the hybrid fiber.

Manganese dioxide is a representative pseudocapacitive material, and, when manganese dioxide is deposited on a hybrid fiber having a coiled structure, electrochemical energy storage capacity may be enhanced.

The manganese dioxide layer may be disposed on a surface of the hybrid fiber having a coiled structure, and, preferably, the deposition process is performed by electrochemical deposition.

The elastic fiber electrode may also have high elasticity sufficient for stretching by 100% to 600%. In addition, even though the elastic fiber electrode is stretched by 100% to 200%, capacitance thereof is maintained at 80% or more, which indicates that the elastic fiber electrode has excellent electrochemical characteristics. In addition, the elastic fiber electrode exhibits a reversible behavior such that the capacitance thereof completely returns to the initial state when contracted.

Figure 4:
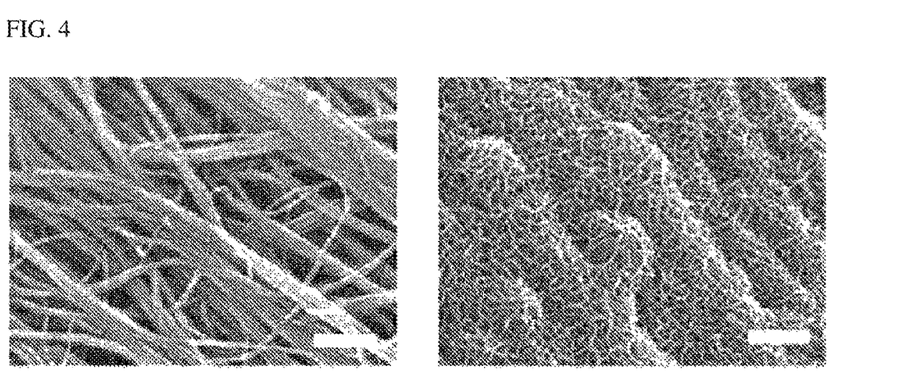
FIG. 4 is a high-magnification enlarged SEM image of an elastic fiber electrode according to the present invention, in which a left image shows a surface of the elastic fiber electrode before deposition of manganese dioxide and a right image shows the surface thereof after deposition of manganese dioxide, a bundle of carbon nanotubes aligned in one direction may be observed in the image before deposition, porous manganese dioxide having a pore diameter of about 50 nm or less may be observed after deposition of manganese dioxide, and the scale bar represents 150 nm.

In addition, the elastic fiber electrode including the manganese dioxide layer also has high elasticity, and an electrochemical area thereof is increased by 100% to 300% by the pseudocapacitive effect. This is because the elastic fiber electrode has a mesoporous structure due to overall covering of the wrinkled surface of the carbon nanotube sheet by the manganese dioxide layer. FIG. 4 is a high-magnification enlarged SEM image showing the surface of the elastic fiber electrode.

The elastic fiber electrode is bendable, knottable, weavable, and standable.

Figure 6:
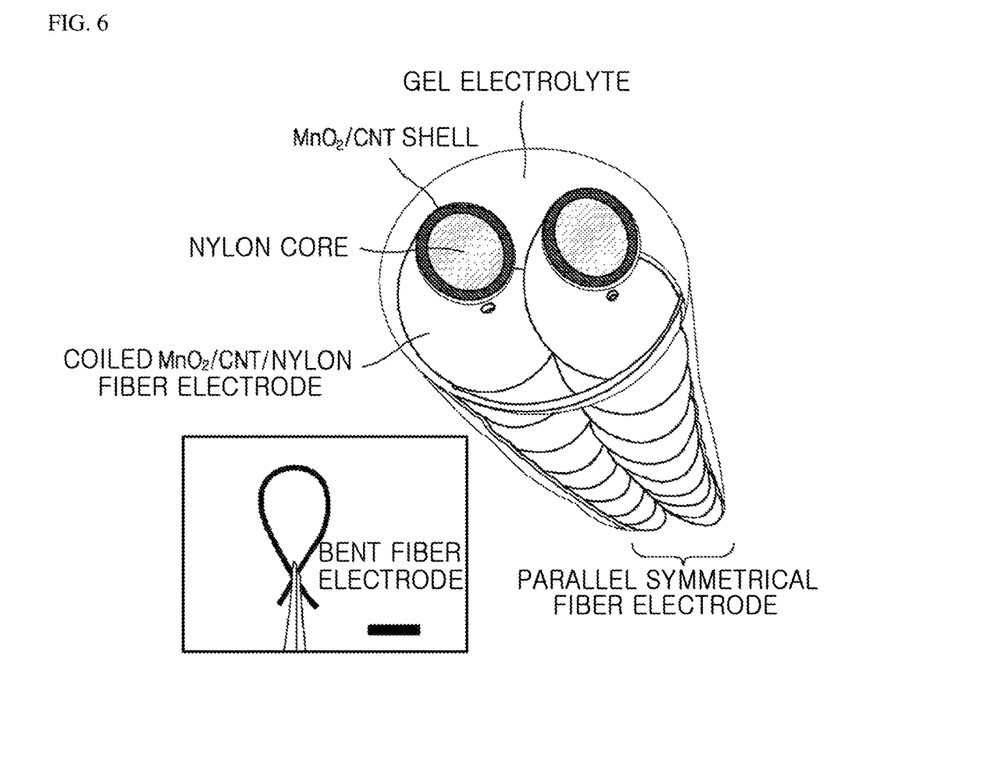
FIG. 6 is an exemplary view illustrating a structure of a micro-supercapacitor using an elastic fiber electrode according to the present invention, in which the interpolated image is an actual image of an elastic fiber electrode according to the present invention for showing that the elastic fiber electrode is flexible and standable.

According to another aspect of the present invention, a micro-supercapacitor includes at least one of the above-described elastic fiber electrodes. A structure of the micro-supercapacitor is illustrated in FIG. 6 in more detail.

The micro-supercapacitor may include a single elastic fiber electrode or two or more elastic fiber electrodes. When two or more elastic fiber electrodes are included in the micro-supercapacitor, the elastic fiber electrodes act as a single strand and has a very stable structure, and thus the coiled structure thereof is not easily unwound, which enables free-standing elastic fiber electrodes.

The micro-supercapacitor may be coated with a solid electrolyte or positioned in a liquid electrolyte. For example, among the solid electrolytes, a gel-type electrolyte may be used.

The micro-supercapacitor may have a capacitance per unit length of 2 mF/cm to 10 mF/cm and a capacitance per unit area of 30 mF/cm$^2$ to 60 mF/cm$^2$, and the capacitance thereof is satisfactorily maintained without a great decrease even at a high scanning rate.

Capacity retention is expressed as an equivalent series resistance (ESR) of 5 Ω/cm$^2$ to 10 Ω/cm$^2$ in a Nyquist curve.

In addition, the micro-supercapacitor provides a stable capacity, i.e., at least 80% or more, even after 100 cycles.

The micro-capacitor may have a current density of 0.2 mA/cm$^2$ to 10 mA/cm$^2$.

According to another embodiment of the present invention, a method of manufacturing the micro-supercapacitor includes the following processes: (a) preparing a hybrid nanofiber by coating a carbon nanotube sheet on a polymer fiber in a wrapping manner; (b) manufacturing an elastic fiber electrode by attaching an end of the hybrid nanofiber to a motor shaft and then coiling the hybrid nanofiber by rotating the motor shaft; and (c) depositing manganese dioxide on a surface of the elastic fiber electrode.

More particularly, first, a carbon nanotube (CNT) aerogel sheet is extracted from a CNT forest by a drawing method and alcohol is evaporated therefrom, thereby forming a high-density CNT sheet.

The CNT sheet is coated on a polymer fiber in a wrapping manner to prepare a hybrid nanofiber, and then one end of the hybrid nanofiber is hung on a support and the other end thereof is connected to an electric motor and then coiled, thereby completing fabrication of the elastic fiber electrode. In this regard, the number of turns may range from about 1,000 turns/meter to about 10,000 turns/m.

Finally, manganese dioxide is deposited on the elastic fiber electrode, and the deposition process is performed by electrochemical deposition. A voltage applied during the electrochemical deposition may range from 1 V to 1.5 V (Ag/AgCl reference electrode). When the voltage is less than 1 V, manganese dioxide particles are insufficiently synthesized. When the voltage is greater than 1.5 V, the surface of the elastic fiber electrode is not uniformly coated with a manganese dioxide layer, the amount of deposition does not increase any longer with respect to the voltage applied, and the manganese dioxide layer formed by deposition may be detached. In addition, when the manganese dioxide layer is electrochemically formed, the thickness of the manganese dioxide layer may be adjusted by selecting a deposition time in a range of 10 seconds to 60 seconds. When the deposition time is less than 10 seconds, it is difficult to visually identify the formation of the manganese dioxide layer. When the deposition time is greater than 60 seconds, adhesion between the manganese dioxide layer and the elastic fiber electrode is low and thus the manganese dioxide layer is detached therefrom.

In this regard, the polymer fiber may be a nylon fiber or a polyester fiber.

MODE OF THE INVENTION

Hereinafter, the present invention will be described in further detail with reference to the following examples, but these examples are not to be construed as limiting the scope and content of the present invention. In addition, based on the disclosure of the present invention including the following examples, it is obvious that the present invention in which experimental results are not specifically shown may be easily carried out by one of ordinary skill in the art, and these modifications and changes are within the appended claims.

Example 1

A 1-3 nm catalyst layer was coated on a silicon wafer by electron beam evaporation, and the silicon wafer with the catalyst layer was placed in a quartz tube preheated at 700° C. in a mixed gas atmosphere containing 750 sccm of argon and 100 sccm of hydrogen. Thereafter, the resulting structure was maintained at the same temperature for 5 minutes and 50 sccm of acetylene was injected to manufacture a multiwall carbon nanotube forest having a length of 400 μm or less and an outer diameter of 12 nm or less and composed of 9 layers.

A multiwall carbon nanotube sheet was drawn from a wall surface on one side of the manufactured multiwall carbon nanotube forest.

The carbon nanotube sheet was coated in a wrapping manner on previously prepared Nylon 6,6 fiber having an average diameter of 102 μm to prepare a hybrid nanofiber. The hybrid nanofiber was coiled by 228 turns per cm to manufacture a 7 cm-long elastic fiber electrode. In this regard, coiling was performed using an electric motor attached to an end of the hybrid nanofiber.

Finally, to deposit manganese dioxide on a surface of the manufactured elastic fiber electrode, the elastic fiber electrode was washed with distilled water and dried. Subsequently, to perform electrochemical deposition, a three electrode system was prepared using an Ag/AgCl electrode as a reference electrode, a Pt electrode as a counter electrode, and the washed elastic fiber electrode as a working electrode.

An electrolyte solution and each electrode were placed in a reactor and a voltage of 1.3 V was applied thereto for 15 minutes based on the reference electrode to manufacture a manganese dioxide-deposited elastic fiber electrode. 0.02 M MnSO$_4$□5H$_2$O and 0.2 M Na$_2$SO$_4$ were used as the electrolyte solution.

FIG. 4 is an SEM image showing a surface of an elastic fiber electrode according to an embodiment of the present invention and a manganese dioxide-deposited elastic fiber electrode according to another embodiment. The scale bar represents 150 nm.

Figure 5:
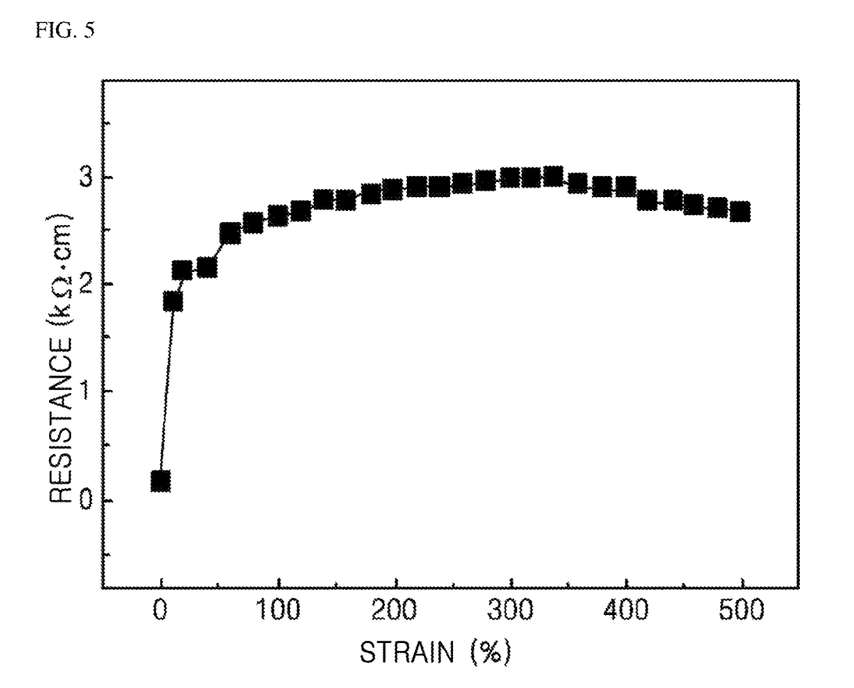
FIG. 5 is a graph showing measurement results of changes in resistance of an elastic fiber electrode of the present invention according to elongation by a stretching force (pressure), in which the elongation represents the length of a stretched elastic fiber electrode with respect to an initial elastic fiber electrode by percentage (%)

As illustrated in FIG. 4, it can be confirmed that the elastic fiber electrode according to an embodiment of the present invention has a surface structure which is aligned in any one direction by a carbon nanotube sheet and has high porosity, while the manganese dioxide-deposited elastic fiber electrode according to another embodiment has a surface structure which is not aligned in any one direction, has a mesoporous structure, and manganese dioxide is uniformly deposited on the overall carbon nanotube sheet. FIG. 5 is a graph showing measurement results of changes in resistance of an elastic fiber electrode of the present invention according to elongation by a stretching force (pressure). In this regard, the elongation represents the length of a stretched elastic fiber electrode with respect to an initial elastic fiber electrode by percentage (%).

In this regard, it can be confirmed that, as the stretching force increased, the length of the elastic fiber electrode increased and resistance thereof rapidly increased. In particular, the elastic fiber electrode had a maximum elongation of 580%.

In this regard, when the elastic fiber electrode has an elongation of 10%, the resistance thereof increased 10-fold (from 0.19 kΩ/cm to 1.83 kΩ/cm) and then increased by about 34% (from 1.83 kΩ/cm to 3 kΩ/cm) up to an elongation of 580%.

When the elastic fiber electrode is stretched, a distance between coils increases and thus an electron transfer path increases and, accordingly, the elastic fiber electrode exhibits a rapid increase in resistance even at an elongation of 10%.

The image inside the graph shows comparison between changes in the length of the elastic fiber electrode having an elongation of 580% (lower image) and an initial elastic fiber electrode (upper image), by a stretching force (pressure), from which it can be confirmed that, as the pressure increases, the coiled structure is unwound and, accordingly, the length thereof increases.

Figure 7A:
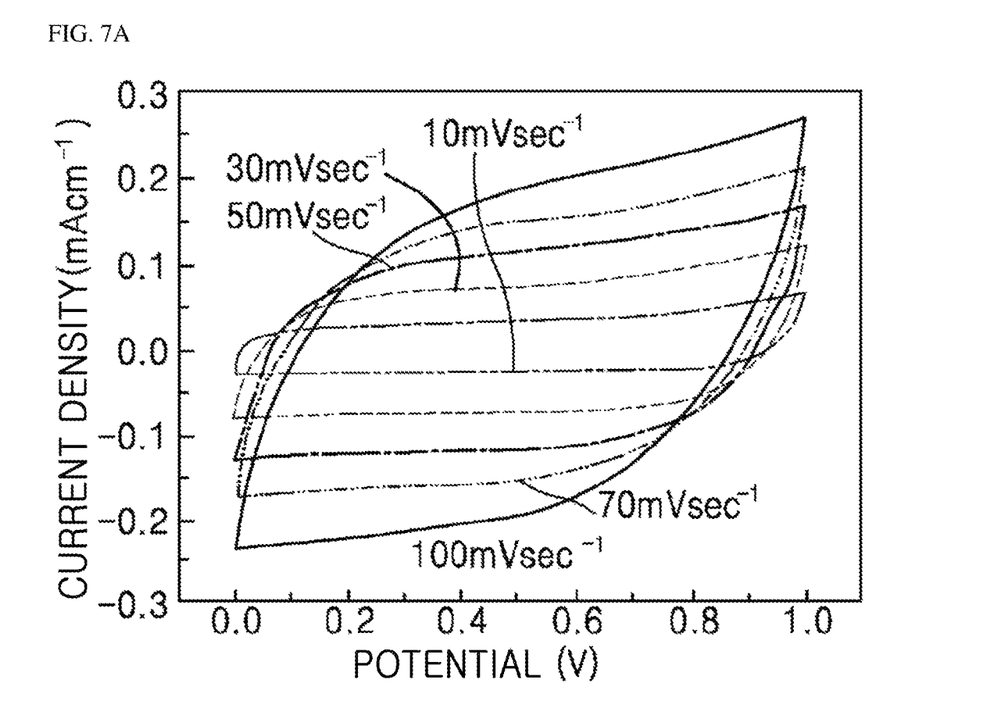
FIG. 7A is a cyclic voltammetry (CV) graph of a micro-supercapacitor including two elastic fiber electrodes coated with a PVA-LiCl gel electrolyte, in which the CV is performed at a scanning rate of 10 mV/s to 100 mV/s.

FIG. 7A is a cyclic voltammetry (CV) graph of a micro-supercapacitor including two elastic fiber electrodes coated with a PVA-LiCl gel electrolyte, in which the CV is performed at a scanning rate of 10 mV/s to 100 mV/s.

As illustrated in FIG. 7A, it can be confirmed that a micro-supercapacitor using the elastic fiber electrode of the present invention shows a quadrangular curve without a redox peak, which indicates excellent capacitance characteristics.

Figure 7B:
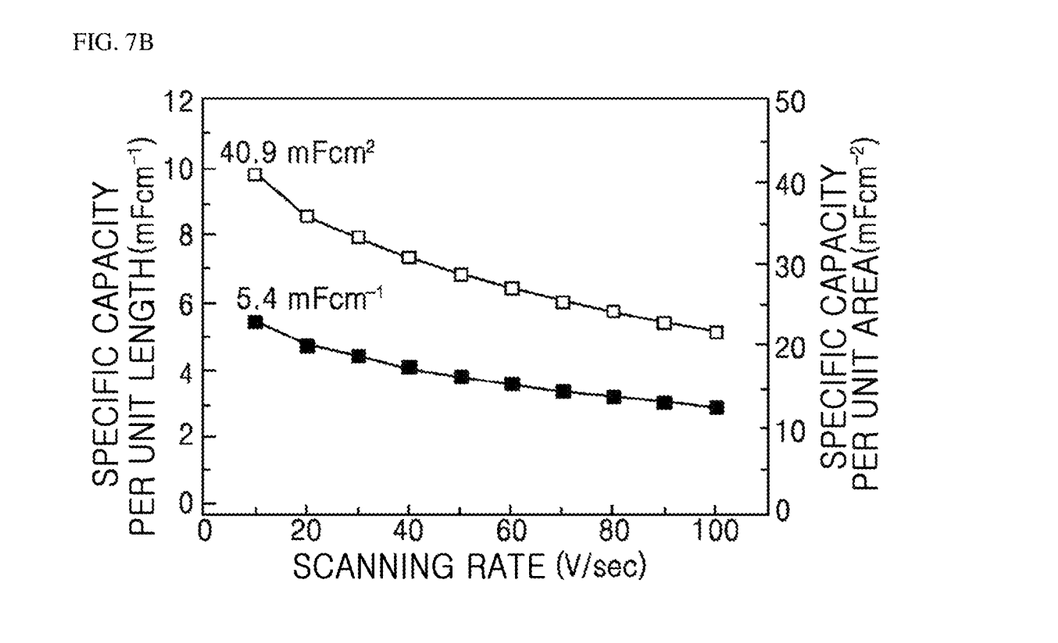
FIG. 7B is a graph showing specific capacitance per unit length or unit area, obtained from FIG. 7A.

FIG. 7B is a graph showing specific capacitance per unit length or unit area, obtained from FIG. 7A.

As illustrated in FIG. 7B, a micro-supercapacitor using the elastic fiber electrode of the present invention has a maximum specific capacitance per unit length of 5.4 mF/cm and a maximum specific capacitance per unit area of 40.9 mF/cm$^2$. In particular, a conventional one-dimensional supercapacitor including manganese dioxide exhibits 0.015 mF/cm and 0.04 mF/cm, and a conventional supercapacitor including a wet spun carbon nanotube/graphene composite fiber exhibits 5.3 mF/cm, which are values much smaller than that of the micro-supercapacitor of the present invention.

Figure 7C:
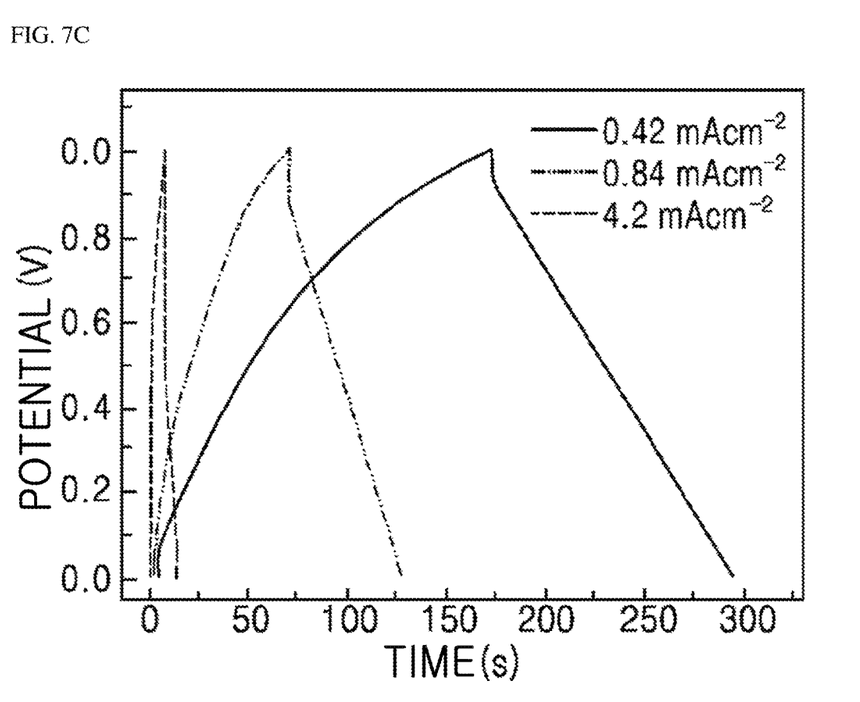
FIG. 7C is a galvanostatic charge/discharge graph of a micro-supercapacitor using an elastic fiber electrode of the present invention.

FIG. 7C is a galvanostatic charge/discharge graph of a micro-supercapacitor using an elastic fiber electrode of the present invention.

As illustrated in FIG. 7C, it can be confirmed that an isosceles triangle-shaped graph is shown within a current density range of 0.42 mA/cm$^2$ to 4.2 mA/cm$^2$ in a micro-supercapacitor using the elastic fiber electrode of the present invention, and thus the micro-supercapacitor including the elastic fiber electrode of the present invention exhibits excellent capacitance characteristics.

Figure 7D:
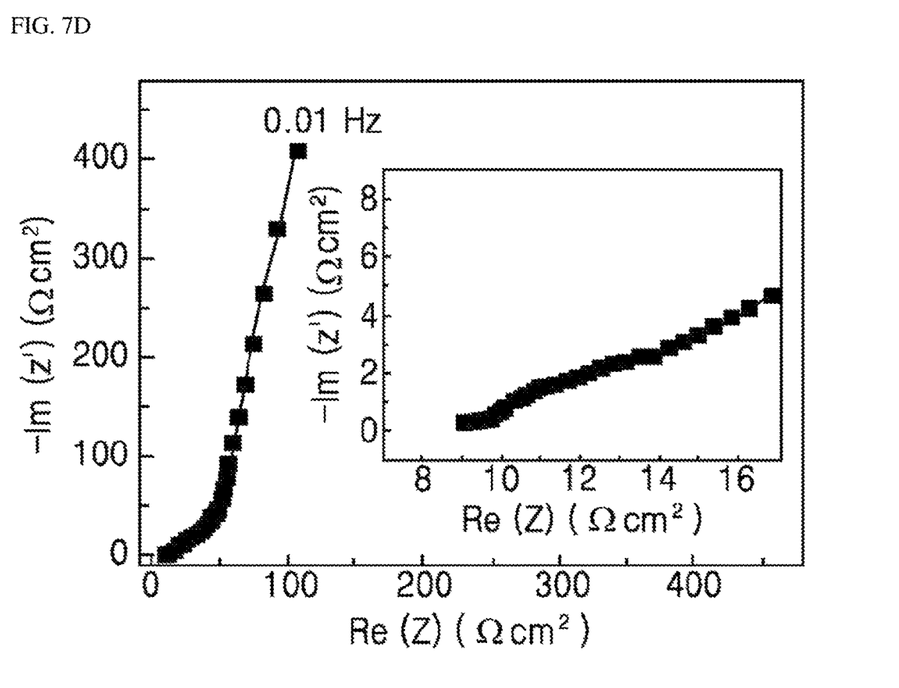
FIG. 7D is a Nyquist graph of a micro-supercapacitor using an elastic fiber electrode of the present invention in a frequency range of 0.1 kHz to 1 kHz, in which the interpolated image is an enlarged graph of a high frequency area.

FIG. 7D is a Nyquist graph of a micro-supercapacitor using an elastic fiber electrode of the present invention in a frequency range of 0.1 kHz to 1 kHz, in which the interpolated image is an enlarged graph of a high frequency area.

As illustrated in FIG. 7D, it can be confirmed that an equivalent series resistance was confirmed as 9 Ω/cm$^2$ in the Nyquist graph through electrochemical impedance spectroscopy, and excellent slope characteristics of the Nyquist graph were observed, and thus the micro-supercapacitor using an elastic fiber electrode of the present invention exhibits excellent capacitance characteristics.

Figure 8A:
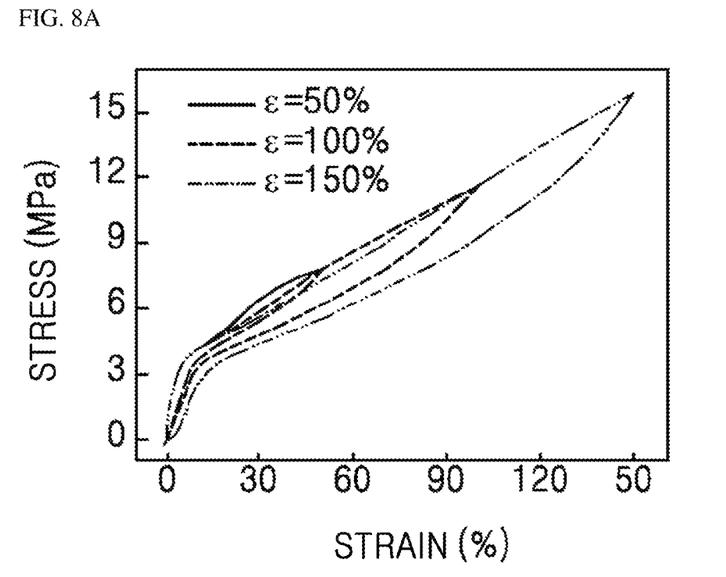
FIG. 8A is a stress-strain graph of an elastic fiber electrode coated with manganese dioxide and a PVA-LiCl gel electrolyte.

FIG. 8A is a stress-strain graph of an elastic fiber electrode not including manganese dioxide. According to the results of FIG. 8A, when a change in the length of the elastic fiber electrode was 150%, the elastic fiber electrode showed an elastic behavior. In contrast, when the length change was 200% or greater, the elastic fiber electrode showed an inelastic behavior.

Figure 8B:
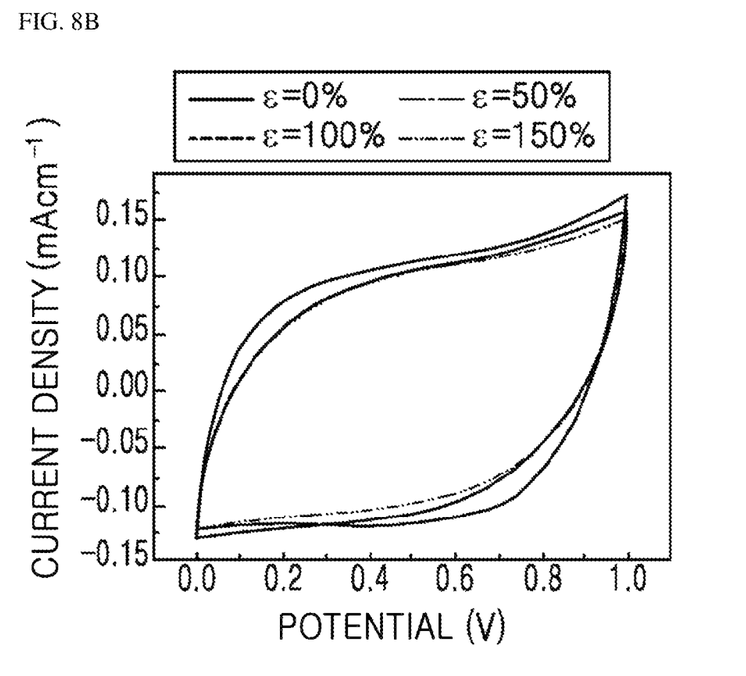
FIG. 8B is a CV graph of a micro-supercapacitor using an elastic fiber electrode of the present invention according to longitudinal elongation.

FIG. 8B is a CV graph of a micro-supercapacitor using an elastic fiber electrode of the present invention according to longitudinal elongation. According to the results of FIG. 8B, it was confirmed that the micro-supercapacitor using an elastic fiber electrode of the present invention had high capacitance retention, i.e., about 86.3%, with respect to the length increased by 50% to 150%.

Figure 8C:
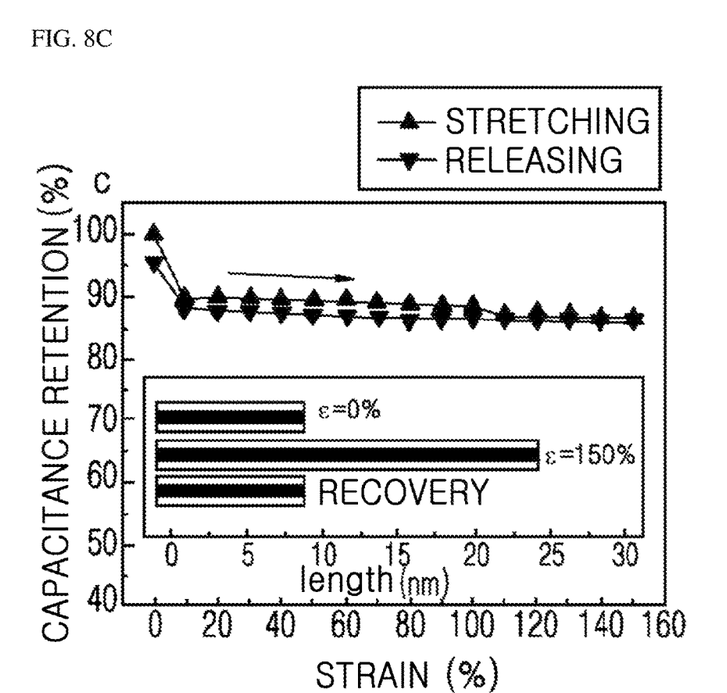
FIG. 8C is a graph showing measurement results of changes in capacitance retention when a micro-supercapacitor using an elastic fiber electrode of the present invention is deformed at a strain of 150% with respect to an initial length and then returns to the initial state, in which the interpolated image is an optical image showing an initial micro-supercapacitor, a 150% elongated micro-supercapacitor, and a micro-supercapacitor having returned to the initial state.

FIG. 8C is a graph showing capacitance retention measured when a micro-supercapacitor using an elastic fiber electrode of the present invention returns to an initial state after being stretched by 150%.

As illustrated in FIG. 8C, it can be observed that the micro-supercapacitor using an elastic fiber electrode of the present invention had a rapidly increased resistance when the elastic fiber electrode was stretched by 10% or more, and thus the capacitance retention was decreased to 89.6%. In addition, it can be confirmed that, as the increased length returns to an initial state, capacitance retention also reversibly returns to an initial state.

Figure 8D:
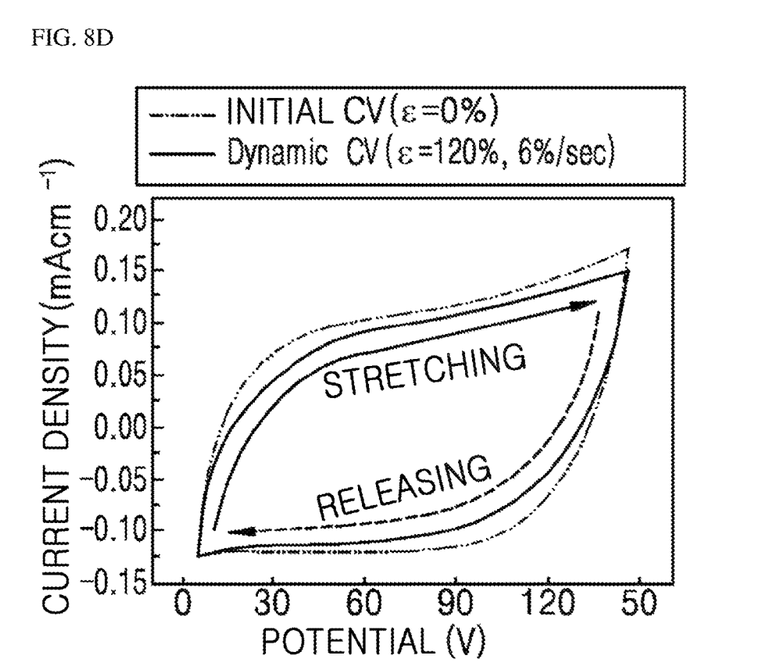
FIGS. 8D to 8F are CV graphs showing real-time measurement results obtained by repeatedly stretching and releasing a micro-supercapacitor manufactured using an elastic fiber electrode of the present invention, to examine whether varying a stretching rate (6% strain/s, 12% strain/s, and 17.1% strain/s) affects electrochemical characteristics.
Figure 8E:
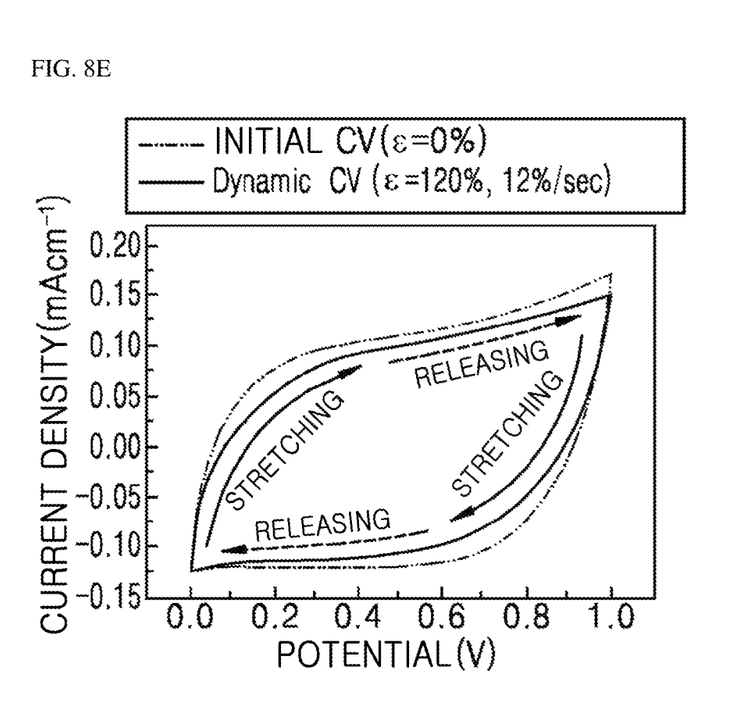
Figure 8F:
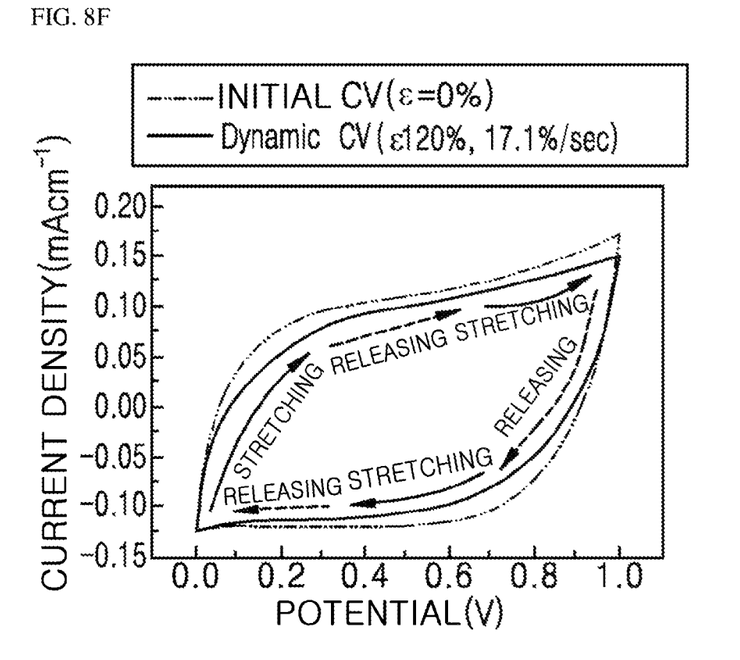

FIGS. 8D to 8F are CV graphs of a micro-supercapacitor using an elastic fiber electrode of the present invention, measured after repetitive stretching and releasing thereof, to examine whether varying a stretching rate (6% strain/s, 12% strain/s, and 17.1% strain/s) affects electrochemical characteristics. In this regard, the maximum length change was progressed until 120% and measured in real time.

As illustrated in FIGS. 8D to 8F, it was confirmed that the micro-supercapacitors exhibited overall reversibility and high capacitance retention and had the highest capacitance retention at 17.1%/s.

INDUSTRIAL APPLICABILITY

A coil- or spring-type elastic fiber electrode according to the present invention has high elasticity and conductivity. In particular, when the porosity of the elastic fiber electrode is increased by depositing manganese dioxide on a surface thereof, electrochemical performance may be enhanced. Thus, a micro-supercapacitor using the elastic fiber electrode according to the present invention may have high current density and excellent capacitance retention, maintain electrochemical characteristics even after being subjected to various deformations, such as bending, coiling, or weaving, and provide stable capacitance even after 100 cycles of stretching/releasing. Due to these characteristics, the elastic fiber electrode according to the present invention and a micro-supercapacitor using the same may be widely used in various fields, such as rotary actuators, medical instruments, and wearable electronic products.

The invention claimed is:

1. An elastic fiber electrode comprising:
   a hybrid fiber having a polymer fiber and a carbon nanotube sheet coated on the polymer fiber,
   wherein the hybrid fiber is in a yarn form having a coiled structure, and the hybrid fiber having the coiled structure has a wrinkled surface formed by the carbon nanotube sheet,
   wherein the elastic fiber electrode is contracted with 100% to 600% less length than the polymer fiber in an initial state.

2. The elastic fiber electrode of claim 1, wherein the coiled structure is obtained by continuous coiling and has a coil or spring shape.

3. The elastic fiber electrode of claim 1, wherein the polymer fiber is a nylon fiber or a polyester fiber.

4. The elastic fiber electrode of claim 1, wherein the carbon nanotube sheet positioned on a surface of the elastic fiber electrode is aligned in one direction and has a porous structure.

5. The elastic fiber electrode of claim 1, wherein the elastic fiber electrode is bendable, knottable, and weavable.

6. A micro-supercapacitor comprising at least one of the elastic fiber electrodes according to claim 1.

7. The micro-supercapacitor of claim 6, wherein the micro-supercapacitor is operable as a capacitor in a liquid or solid electrolyte.

8. The micro-supercapacitor of claim 6, wherein the micro-supercapacitor has a capacitance per unit length of 3 mF/cm to 10 mF/cm and a capacitance per unit area of 30 mF/cm$^2$ to 60 mF/cm$^2$.

9. The micro-supercapacitor of claim 6, wherein the micro-supercapacitor has a current density of 0.2 mA/cm$^2$ to 10 mA/cm$^2$.

10. The micro-supercapacitor of claim 6, wherein the micro-supercapacitor is bendable, knottable, weavable, and standable.

11. A method of manufacturing the elastic fiber electrode of claim 1, the method comprising:
(a) preparing a hybrid nanofiber by coating a carbon nanotube sheet on a polymer fiber in a wrapping manner; and
(b) manufacturing an elastic fiber electrode by attaching an end of the hybrid nanofiber to a motor shaft and coiling the hybrid nanofiber by rotating the motor shaft to obtain the elastic fiber electrode according to claim 1.

12. The method of claim 11, wherein, in the (b) process, the hybrid nanofiber is coiled in a wet state.

13. The method of claim 11, wherein the polymer fiber is a nylon fiber or a polyester fiber.

14. The method of claim 11, wherein the carbon nanotube sheet is a high-density sheet formed by evaporating alcohol from a carbon nanotube aerogel sheet.

15. The method of claim 11, further comprising:
(c) depositing manganese dioxide on a surface of the elastic fiber electrode.

16. The method of claim 15, wherein the depositing of the (c) process is performed by electrochemical deposition.

17. An elastic fiber electrode comprising:
a hybrid fiber having a polymer fiber and a carbon nanotube sheet coated on the polymer fiber, wherein the hybrid fiber is in a yarn form having a coiled structure and hybrid fiber having the coiled structure has a wrinkled surface formed by the carbon nanotube sheet; and
a manganese dioxide layer deposited on a surface of the hybrid fiber,
wherein the elastic fiber electrode has an elongation of 100% to 600%.

18. The elastic fiber electrode of claim 17, wherein the elastic fiber electrode maintains a capacitance of 80% to 90% even when stretched by 10% to 200%, and has a reversible structure such that the elastic fiber electrode has an original capacitance when having returned to an initial state.

19. A micro-supercapacitor comprising at least one of the elastic fiber electrodes according to claim 17.

20. The micro-supercapacitor of claim 19, wherein the micro-supercapacitor is operable as a capacitor in a liquid or solid electrolyte.

* * * * *